(12) United States Patent
Thiebaut et al.

(10) Patent No.: US 11,894,937 B2
(45) Date of Patent: Feb. 6, 2024

(54) LOCAL USER PLANE FUNCTION CONTROL

(71) Applicant: NOKIA TECHNOLOGIES OY, Espoo (FI)

(72) Inventors: Laurent Thiebaut, Antony (FR); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 64 days.

(21) Appl. No.: 17/600,044

(22) PCT Filed: Apr. 2, 2019

(86) PCT No.: PCT/EP2019/058312
§ 371 (c)(1),
(2) Date: Sep. 29, 2021

(87) PCT Pub. No.: WO2020/200434
PCT Pub. Date: Oct. 8, 2020

(65) Prior Publication Data
US 2022/0200813 A1    Jun. 23, 2022

(51) Int. Cl.
*H04L 12/14*    (2006.01)
*H04L 47/12*    (2022.01)
(Continued)

(52) U.S. Cl.
CPC .......... *H04L 12/1407* (2013.01); *H04L 47/12* (2013.01); *H04L 67/14* (2013.01); *H04L 67/5682* (2022.05)

(58) Field of Classification Search
CPC . H04L 12/14; H04L 12/1403; H04L 12/1407; H04L 67/00; H04L 67/14;
(Continued)

(56) References Cited

U.S. PATENT DOCUMENTS

2018/0199398 A1\*   7/2018   Dao .................... H04L 41/5019
2020/0077329 A1\*   3/2020   Zhu ....................... H04W 48/18
(Continued)

FOREIGN PATENT DOCUMENTS

CN    109413619 A    3/2019
CN    109547957 A    3/2019
(Continued)

OTHER PUBLICATIONS

First Examination Report dated Apr. 22, 2022 corresponding to Indian Patent Application No. 202147050024.
(Continued)

*Primary Examiner* — Warner Wong
(74) *Attorney, Agent, or Firm* — SQUIRE PATTON BOGGS (US) LLP

(57) ABSTRACT

There are provided measures for local user plane function control. Such measures exemplarily comprise obtaining access network related information, receiving, from a session management function entity, at least one pre-rule, generating, based on said at least one pre-rule and said access network related information, a first rule of at least one rule related to local traffic offloading, assigning said first rule to a first user plane function entity of at least one user plane function entity under control of said intermediate session management function entity, and transmitting said first rule to said first user plane function entity.

17 Claims, 11 Drawing Sheets

(51) Int. Cl.
*H04L 67/14* (2022.01)
*H04L 67/5682* (2022.01)

(58) Field of Classification Search
CPC ..... H04L 67/147; H04L 67/148; H04L 47/12; H04L 47/122; H04L 47/125; H04L 67/5682; H04L 41/0803; H04L 41/0894; H04L 47/128; H04L 47/783; H04L 12/2896; H04W 28/0925; H04W 72/52; H04W 72/535; H04W 4/50; H04W 16/08; H04W 28/08
See application file for complete search history.

(56) References Cited

U.S. PATENT DOCUMENTS

| | | | |
|---|---|---|---|
| 2020/0112898 A1* | 4/2020 | Ramle | H04W 8/08 |
| 2020/0112907 A1* | 4/2020 | Dao | H04M 15/84 |
| 2020/0137828 A1* | 4/2020 | Yang | H04W 8/08 |
| 2020/0204976 A1* | 6/2020 | Hu | H04W 8/12 |
| 2020/0323029 A1* | 10/2020 | Lu | H04W 76/11 |
| 2020/0344655 A1* | 10/2020 | Rommer | H04W 76/36 |
| 2020/0344827 A1* | 10/2020 | Zong | H04W 64/00 |
| 2020/0351985 A1* | 11/2020 | Zhu | H04W 76/11 |
| 2020/0374765 A1* | 11/2020 | Zong | H04W 36/0055 |
| 2021/0037585 A1* | 2/2021 | Youn | H04W 76/30 |
| 2021/0360506 A1* | 11/2021 | Yang | H04W 40/02 |
| 2021/0385723 A1* | 12/2021 | Zong | H04L 69/40 |
| 2022/0346190 A1* | 10/2022 | Zhu | H04M 15/66 |

FOREIGN PATENT DOCUMENTS

| | | | | |
|---|---|---|---|---|
| KR | 2019/0136948 | * | 5/2019 | H04W 28/02 |
| WO | WO 2019/184721 | * | 10/2019 | H04L 29/08 |

OTHER PUBLICATIONS

NEC, "KI-#5 specific AF influence on traffic routing," 3GPP Draft; S2-1900613, 3GPP TSG-SA2 Meeting #130, Kochi, India, Jan. 21-25, 2019.
International Search Report and Written Opinion, corresponding to International Patent Application No. PCT/EP2019/058312, dated Nov. 5, 2019.
NEC et al., "KI-#5 specific AF influence on traffic routing", 3GPP TSG-SA2 Meeting #130, Kochi, India, Jan. 21-25, 2019, S2-1900758, XP051595491, 3 pages.
3GPP TS 23.501 V16.0.2 (Apr. 2019), 3rd Generation Partnership Project; Technical Specification Group Services and System Aspects; System Architecture for the 5G System; Stage 2, (Release 16), 317 pages.
3GPP TS 23.502 V16.0.2 (Apr. 2019), 3rd Generation Partnership Project; Technical Specification Group Services and System Aspects; Procedures for the 5G System; Stage 2, (Release 16), 419 pages.
3GPP TS 29.244 V15.5.0 (Mar. 2019), 3rd Generation Partnership Project; Technical Specification Group Core Network and Terminals; Interface between the Control Plane and the User Plane Nodes; Stage 3, (Release 15), 198 pages.
3GPP TS 23.503 V16.0.0 (Mar. 2019), 3rd Generation Partnership Project; Technical Specification Group Services and System Aspects; Policy and Charging Control Framework for the 5G System; Stage 2, (Release 16), 84 pages.
First Office Action dated Mar. 24, 2023 corresponding to Chinese Patent Application No. 201980096877.6, with Search Report.
Chinese Office Action issued in corresponding Chinese Patent Application No. 201980096877.6 dated Aug. 5, 2023.

* cited by examiner

LOCAL USER PLANE FUNCTION CONTROL

FIELD

The present invention relates to local user plane function control. More specifically, the present invention exemplarily relates to measures (including methods, apparatuses and computer program products) for realizing local user plane function control.

BACKGROUND

The present specification generally relates to scenarios in which two session management functions (SMF) are/may be involved for one protocol data unit (PDU) session.

In detail, 3rd Generation Partnership Project (3GPP) is developing a variant of the session management architecture in the 5G system where within a big public land mobile network (PLMN) there may be two SMFs involved for a PDU session.

Namely, on the one hand, in such scenario, an SMF is provided which is responsible of the overall PDU session service and supports the interfaces with a policy control function (PCF) and a charging function (CHF).

Further, on the one hand, in such scenario, an intermediate session management function (I-SMF) interfacing the 5G access network (AN) via the access and mobility management function (AMF) and controlling the local user plane functions (UPF) is provided.

5G access network is referred to in the present specification also as "5G AN" or even just as "(R)AN" or "AN".

For session management architectures with an I-SMF, 3GPP has agreed that, when the SMF cannot control the UPF terminating the N3 interface used by a PDU session and session and service continuity (SSC) mode 2/3 procedures are not applied to the PDU session, an I-SMF is inserted between the SMF and the AMF.

FIG. 6 shows a schematic diagram of an example of a system environment with respective interfaces between respective network entities in such scenario and in particular reflects an overall architecture in such scenario.

The I-SMF has an N11 interface with the AMF and an N16a interface with the SMF and is responsible of controlling the UPF(s) that the SMF cannot directly control.

The exchange of the session management (SM) context and forwarding tunnel information if needed are interacted between two SMFs directly without involvement of AMF.

Depending on scenario, a PDU session in non-roaming case or local breakout is either served by a single SMF or served by an SMF and an I-SMF.

When a PDU Session is served by both an SMF and an I-SMF, the SMF is the network function (NF) instance that has the interfaces towards the PCF and CHF.

Here, an UPF is controlled over an N4 interface. This control refers to packet detection rules (PDR), forwarding action rules (FAR), usage reporting rules (URR) and quality of service (QoS) enforcement rules (QER) but may refer to other kind of rules and information such as Tracing requirement.

Here, PDR contains information to classify traffic (PDU (s)) arriving at the UPF. PDR in particular includes traffic filters to identified traffic to be forwarded/duplicated/etc. per the corresponding FAR, to be counted/monitored per the corresponding URR, and/or to be subject of QoS handling per the corresponding QER. Further, FAR contains information on whether forwarding, dropping or buffering is to be applied to a traffic identified by PDR(s). Further, URR contains information that defines how traffic identified by PDR(s) shall be measured as well as how a certain measurement shall be reported. Finally, QER contains information related to QoS enforcement of traffic identified by PDR(s).

The present specification particularly relates to scenarios in which the local UPF(s) controlled by the I-SMF is used to locally offload some traffic based on application instructions.

FIGS. 7 and 8 show schematic diagrams of examples of a system environment with respective interfaces between respective network entities.

In particular, FIG. 7 illustrates an architecture with the I-SMF controlling an uplink classifier (UL CL) and a local PDU session anchor (PSA), while FIG. 8 illustrates an architecture with the I-SMF controlling a branching point (BP) and a local PDU session anchor (PSA).

In these scenarios, the local UPF(s) may support the role of local PDU session anchors (PSA) that are the termination points of the N6 interface to the data network (DN), and/or the role of an uplink classifier (UL CL) or branching point (BP) that are responsible of splitting uplink traffic coming from the user equipment (UE) (via 5G AN) between traffic sent to the local PSA (PSA2) from traffic sent to the central access to the DN (PSA1).

In other words, it is up to local deployment/decision whether a local UPF fulfills/supports/implements the role of both UL CL and PSA2, fulfills/supports/implements the role of both BP and PSA2, fulfills/supports/implements the role of either UL CL or PSA2, or fulfills/supports/implements the role of either BP or PSA2.

However, in the above-illustrates scenarios, the following difficulties arise.

It is provided that the SMF receives from PCF policy and charging control (PCC) rules that state which traffic is to be offloaded locally (towards a local access to the DN identified by an DN access identifier (DNAI)) together with the QoS to apply to this traffic and possibly related usage monitoring requirements.

The SMF receives also from the CHF charging rules related with this offloaded traffic. If the PCF does not apply, the SMF may also be locally configured with rules related with traffic offload.

Information received from PCF and CHF are necessary to build PDR, FAR, URR, QER and other rules related with offloaded traffic and to be sent to local UPF(s).

However, the SMF cannot control the local UPF, which has to be controlled by the I-SMF.

Part of the information needed to build the PDR, FAR, URR and other rules comes from the 5G AN (e.g. gNB) via the AMF and corresponds to addressing information of the 5G AN termination of the N3 interface associated with the PDU Session.

Requiring to pass this information via the I-SMF to the SMF is very signaling intensive (as this N3 addressing information at the 5G AN changes each time there is an inter gNB handover (HO) or a transition between IDLE and CONNECTED state for the UE).

Further, requiring to pass the information received by the SMF towards the I-SMF and moving towards the I-SMF the responsibility of building PDR, FAR, URR, QER and other rules related with offloaded traffic and to be sent to local UPF(s) would require substantial amendments to be effected to present SMFs.

Hence, the problem arises that control of local UPFs by means of the SMF is very signaling intensive, while control of local UPFs by means of the I-SMF would require substantial amendments to the SMF.

Hence, there is a need to provide for (an improved) local user plane function control.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a session management function entity, comprising obtaining policy related information and charging related information, generating at least one pre-rule based on said policy related information and said charging related information, wherein each pre-rule of said at least one pre-rule being a respective pre-stage of a respective rule related to local traffic offloading with respect to user plane function entities under control of an intermediate session management function entity, and transmitting said at least one pre-rule to said intermediate session management function entity.

According to an exemplary aspect of the present invention, there is provided a method of an intermediate session management function entity comprising obtaining access network related information, receiving, from a session management function entity, at least one pre-rule, generating, based on said at least one pre-rule and said access network related information, a first rule of at least one rule related to local traffic offloading, assigning said first rule to a first user plane function entity of at least one user plane function entity under control of said intermediate session management function entity, and transmitting said first rule to said first user plane function entity.

According to an exemplary aspect of the present invention, there is provided an apparatus operable as or at a session management function entity, the apparatus comprising obtaining circuitry configured to obtain policy related information and charging related information, generating circuitry configured to generate at least one pre-rule based on said policy related information and said charging related information, wherein each pre-rule of said at least one pre-rule being a respective pre-stage of a respective rule related to local traffic offloading with respect to user plane function entities under control of an intermediate session management function entity, and transmitting circuitry configured to transmit said at least one pre-rule to said intermediate session management function entity.

According to an exemplary aspect of the present invention, there is provided an apparatus operable as or at an intermediate session management function entity, the apparatus comprising obtaining circuitry configured to obtain access network related information, receiving circuitry configured to receive, from a session management function entity, at least one pre-rule, generating circuitry configured to generate, based on said at least one pre-rule and said access network related information, a first rule of at least one rule related to local traffic offloading, assigning circuitry configured to assign said first rule to a first user plane function entity of at least one user plane function entity under control of said intermediate session management function entity, and transmitting circuitry configured to transmit said first rule to said first user plane function entity.

According to an exemplary aspect of the present invention, there is provided an apparatus operable as or at a session management function entity, the apparatus comprising at least one processor, at least one memory including computer program code, and at least one interface configured for communication with at least another apparatus, the at least one processor, with the at least one memory and the computer program code, being configured to cause the apparatus to perform obtaining policy related information and charging related information, generating at least one pre-rule based on said policy related information and said charging related information, wherein each pre-rule of said at least one pre-rule being a respective pre-stage of a respective rule related to local traffic offloading with respect to user plane function entities under control of an intermediate session management function entity, and transmitting said at least one pre-rule to said intermediate session management function entity.

According to an exemplary aspect of the present invention, there is provided an apparatus operable as or at an intermediate session management function entity, the apparatus comprising at least one processor, at least one memory including computer program code, and at least one interface configured for communication with at least another apparatus, the at least one processor, with the at least one memory and the computer program code, being configured to cause the apparatus to perform obtaining access network related information, receiving, from a session management function entity, at least one pre-rule, generating, based on said at least one pre-rule and said access network related information, a first rule of at least one rule related to local traffic offloading, assigning said first rule to a first user plane function entity of at least one user plane function entity under control of said intermediate session management function entity, and transmitting said first rule to said first user plane function entity.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient utilization/preservation of signaling resources, while the impact to present SMFs is kept low, to thereby solve at least part of the problems and drawbacks identified in relation to the prior art.

By way of exemplary embodiments of the present invention, there is provided local user plane function control. More specifically, by way of exemplary embodiments of the present invention, there are provided measures and mechanisms for realizing local user plane function control.

Thus, improvement is achieved by methods, apparatuses and computer program products enabling/realizing local user plane function control.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
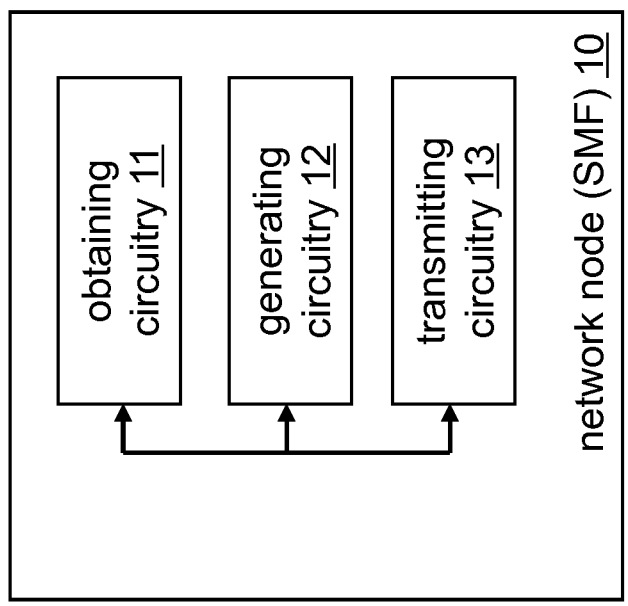
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications and in particular 5G being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) local user plane function control.

As mentioned above, when the I-SMF is inserted into a PDU Session, e.g. during PDU Session establishment or due to UE mobility, the I-SMF provides the DNAI list it supports to the SMF.

Based on the DNAI list information received from I-SMF, the SMF may provide location information for local traffic steering to the I-SMF e.g. immediately or when a new or updated or removed PCC rule(s) is/are received.

The location information for local traffic steering is derived from PCC rules and refers to the DNAI(s) of interest for the PDU sessions that are served by the I-SMF.

The I-SMF is responsible for the insertion, modification and removal of UPF(s) to ensure local traffic steering. The SMF does not need to have access to local configuration or network repository function (NRF) output related with UPF(s) controlled by I-SMF.

Based on the location information for local traffic steering and UE location, the I-SMF may select UPF(s) acting as UL CL/BP and/or PDU session anchor (PSA) based on selected DNAI, and insert these UPF(s) into the data path of the PDU Session.

When an UL CL/BP has been inserted, changed or removed, the I-SMF indicates to the SMF that traffic offload has been inserted, updated or removed for a DNAI, providing also the IPv6 prefix that has been allocated in case a new IPv6 prefix has been allocated for the PDU session.

From this moment on the SMF and I-SMF interactions entail the following.

On the one hand, the UE is notified with the new Prefix (multi-homing case). Here, the SMF is responsible of issuing router advertisement to the UE including the priorities provided to the UE to select among the prefixes related with the PDU Session.

Further, on the other hand, N4 interactions related with traffic offloading are conducted. The SMF may provide N4 information to the I-SMF for how the traffic shall be detected, enforced, monitored in UPF(s) controlled by the I-SMF. Here, the SMF issues requests to the I-SMF containing N4 information to be used for creating/updating/removing PDR, FAR, QER, URR and other rules.

Finally, N4 notifications related with traffic usage reporting are received. Here, the I-SMF forwards to the SMF N4 information corresponding to UPF notifications related with traffic usage reporting. Further, the SMF aggregates and constructs usage reports towards PCF/CHF.

It is, however, not agreed how the SMF decides what traffic steering and enforcement actions are enforced in UPF(s) controlled by I-SMF. It is further not agreed how the I-SMF maps between N4 Information, received from SMF on N16a and actual PDR, FAR, QER, URR, sent on N4 to the UPF(s) it controls, for example how the network instance (if necessary) sent over N4 to the "local UPF" is determined.

It is nevertheless clear that the I-SMF is responsible of the N4 interface towards the local UPF(s) including the usage of AN tunnel info received from the 5G AN via the AMF in order to build PDR and FAR or to control UPF actions when the User Plane of the PDU Session becomes INACTIVE.

In view of the above, exemplary embodiments of the present invention are based on the idea that the I-SMF needs information from SMF and information from 5G AN in order to build N4 PDR, FAR, URR, QER (and other rules) to be sent to the local UPF.

Namely, to reduce the signaling (i.e. to reduce the forwarding of AN information from I-SMF to SMF), the I-SMF might be configured to generate the rules based on information from PCF and CHF as well as from AN.

In this case, however, the (main) SMF would be configured to (simply) forward all information received from PCF and CHF to the I-SMF that would then generate the rules.

This, however, would affect the (main) SMF to a great extent by the new procedure, as this would mean many changes for the SMF. Indeed the SMF is responsible of hiding the existence of I-SMF from PCF and CHF especially with regard to usage monitoring and charging related reporting towards PCF and CHF. If all control of PDR, FAR, URR, QER (and other rules) to be sent to the local UPF(s) would have been left to I-SMF it would have been difficult for SMF to build aggregates between information reported by local UPF and information reported by the UPF the SMF directly controls in order to build aggregated usage monitoring and charging related reporting towards PCF and CHF.

The decision on whether one or two or more local UPFs are used, however, is up to the I-SMF alone, and the main SMF should on the one hand not have to care about the actual deployment of UPF(s) under control of an I-SMF, and on the other hand is also not in possession of such information.

Thus, a concept underlying the present invention is that rules are finally generated in the I-SMF, while the (main) SMF generates "rules" based on the information it is in possession of (i.e. information from PCF and CHF, but not from AN) and includes an indication that final generation of the rules is to be done by the I-SMF. In so doing, the (main) SMF generates the rules always as if only one UPF is used. The I-SMF, then, finally generates the rules together with information from AN and including knowledge on the actual deployment of UPFs that are used. Accordingly, the SMF's logic is not affected to a large extent.

According to exemplary embodiments of the present invention, the I-SMF is provided with necessary information without causing excessive signaling but with preserving SMF logic to a high extent in order to minimize the impacts to the SMF.

Thus, in summary, according to exemplary embodiments of the present invention, the SMF (e.g. when it has been informed that local offload to a DNAI is possible) creates N4 information (PDR, FAR, QER, URR, and potentially other rules) to be sent to the local UPF(s) as if it was controlling the local UPF(s). In particular, the SMF generates pre-rules that are a respective pre-stage of a respective rule, for example a "semi-finished" rule, or a "partly-generated" rule.

As the SMF cannot know information coming from the 5G AN and needed to build N4 rules, the SMF gives to corresponding information a specific value meaning that the actual (refined) content is to be determined by the I-SMF based on local information.

According to exemplary embodiments of the present invention, the SMF does not need to know whether the I-SMF has picked one or two UPF(s) to host the PSA2 and UL CL/BP functionalities. Instead, the SMF creates PDR, FAR, QER, URR, and potentially other rules as if there was only one local UPF.

Subsequently, the I-SMF may split up the N4 information (pre-rules) between local UPF(s), if the I-SMF has decided to use multiple local UPF(s).

Exemplary embodiments of the present invention are now described in more detail.

Figure 4:
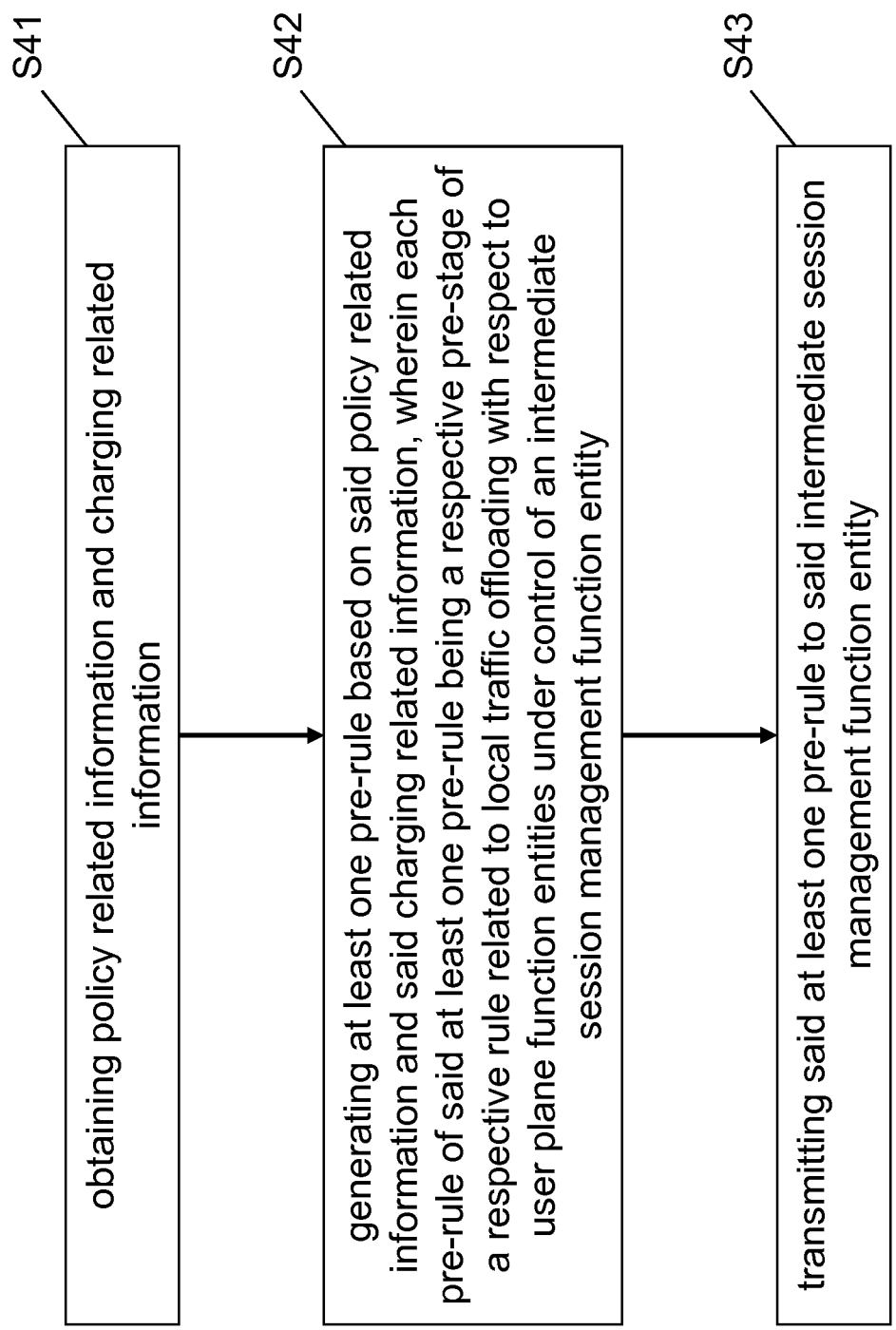
FIG. 4 is a schematic diagram of a procedure according to exemplary embodiments of the present invention.

FIG. 1 is a block diagram illustrating an apparatus according to exemplary embodiments of the present invention. The apparatus may be a network node 10 such as a session management function entity comprising an obtaining circuitry 11, a generating circuitry 12, and a transmitting circuitry 13. The obtaining circuitry 11 obtains policy related information and charging related information. The generating circuitry 12 generates at least one pre-rule based on said policy related information and said charging related information, wherein each pre-rule of said at least one pre-rule being a respective pre-stage of a respective rule related to local traffic offloading with respect to user plane function entities under control of an intermediate session management function entity. The transmitting circuitry 13 transmits said at least one pre-rule to said intermediate session management function entity. FIG. 4 is a schematic diagram of a procedure according to exemplary embodiments of the present invention. The apparatus according to FIG. 1 may perform the method of FIG. 4 but is not limited to this method. The method of FIG. 4 may be performed by the apparatus of FIG. 1 but is not limited to being performed by this apparatus.

As shown in FIG. 4, a procedure according to exemplary embodiments of the present invention comprises an operation of obtaining (S41) policy related information and charging related information, an operation of generating (S42) at least one pre-rule based on said policy related information and said charging related information, wherein each pre-rule of said at least one pre-rule being a respective pre-stage of a respective rule related to local traffic offloading with respect to user plane function entities under control of an intermediate session management function entity, and an operation of transmitting (S43) said at least one pre-rule to said intermediate session management function entity.

Figure 2:
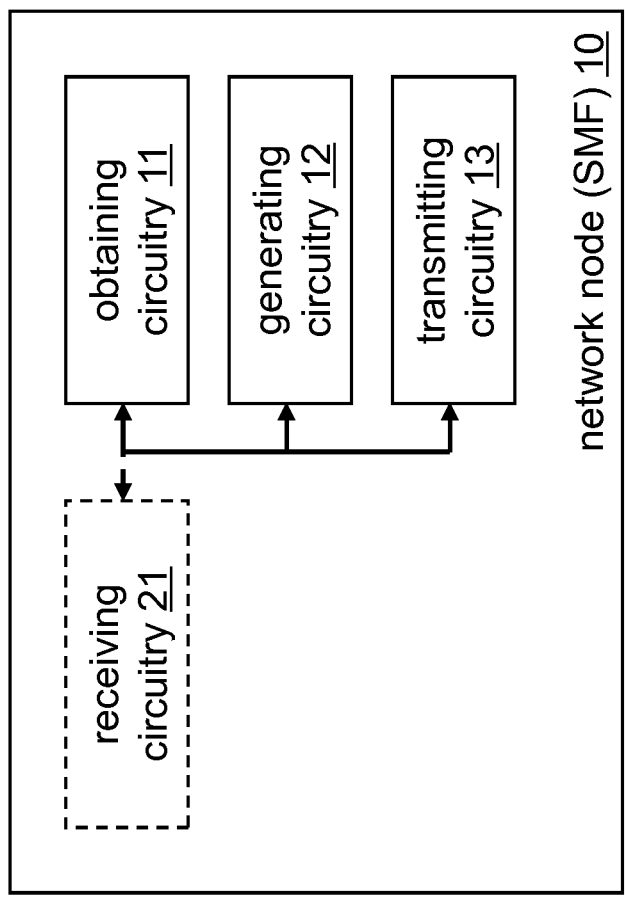
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a receiving circuitry 21.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to exemplary embodiments of the present invention, said at least one pre-rule is indicative of being said respective pre-stage of said respective rule.

According to further exemplary embodiments of the present invention, said pre-rule comprises a unique identifier.

According to further exemplary embodiments of the present invention, said pre-rule comprises references to information that said intermediate session management function entity is to determine locally in order to generate said respective rule to be transmitted to user plane function entities under control of said intermediate session management function entity.

According to a variation of the procedure shown in FIG. 4, exemplary details of the generating operation (S42) are given, which are inherently independent from each other as such.

In such exemplary generating operation (S42) according to exemplary embodiments of the present invention, said at least one pre-rule is generated assuming that in relation to said local traffic offloading not more than one user plane function entity is under control of said intermediate session management function entity.

According to a variation of the procedure shown in FIG. 4, exemplary additional operations are given, which are inherently independent from each other as such. According to such variation, an exemplary method according to exemplary embodiments of the present invention may comprise an operation of receiving said policy related information from a policy control function entity.

According to a variation of the procedure shown in FIG. 4, exemplary additional operations are given, which are inherently independent from each other as such. According to such variation, an exemplary method according to exemplary embodiments of the present invention may comprise an operation of receiving said charging related information from a charging function entity.

According to further exemplary embodiments of the present invention, said user plane function entity supports at least one of a protocol data unit session anchor, an uplink classifier, and a branching point.

According to further exemplary embodiments of the present invention, each of said at least one rule related to local traffic offloading is one of a packet detection rule, a forwarding action rule, a usage reporting rule, and a quality of service enforcement rule.

Figure 3:
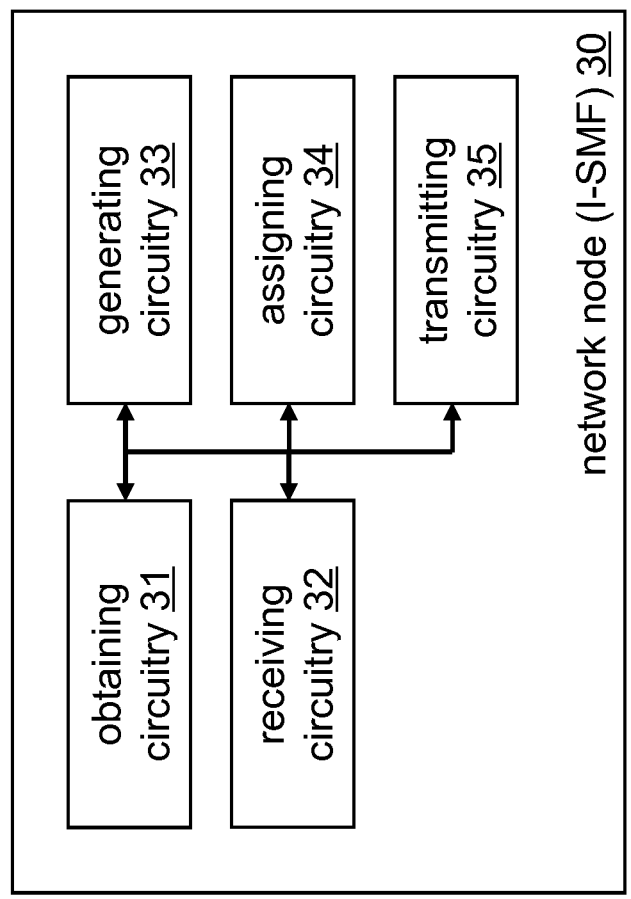
FIG. 3 is a block diagram illustrating an apparatus according to exemplary embodiments of the present invention.
Figure 5:
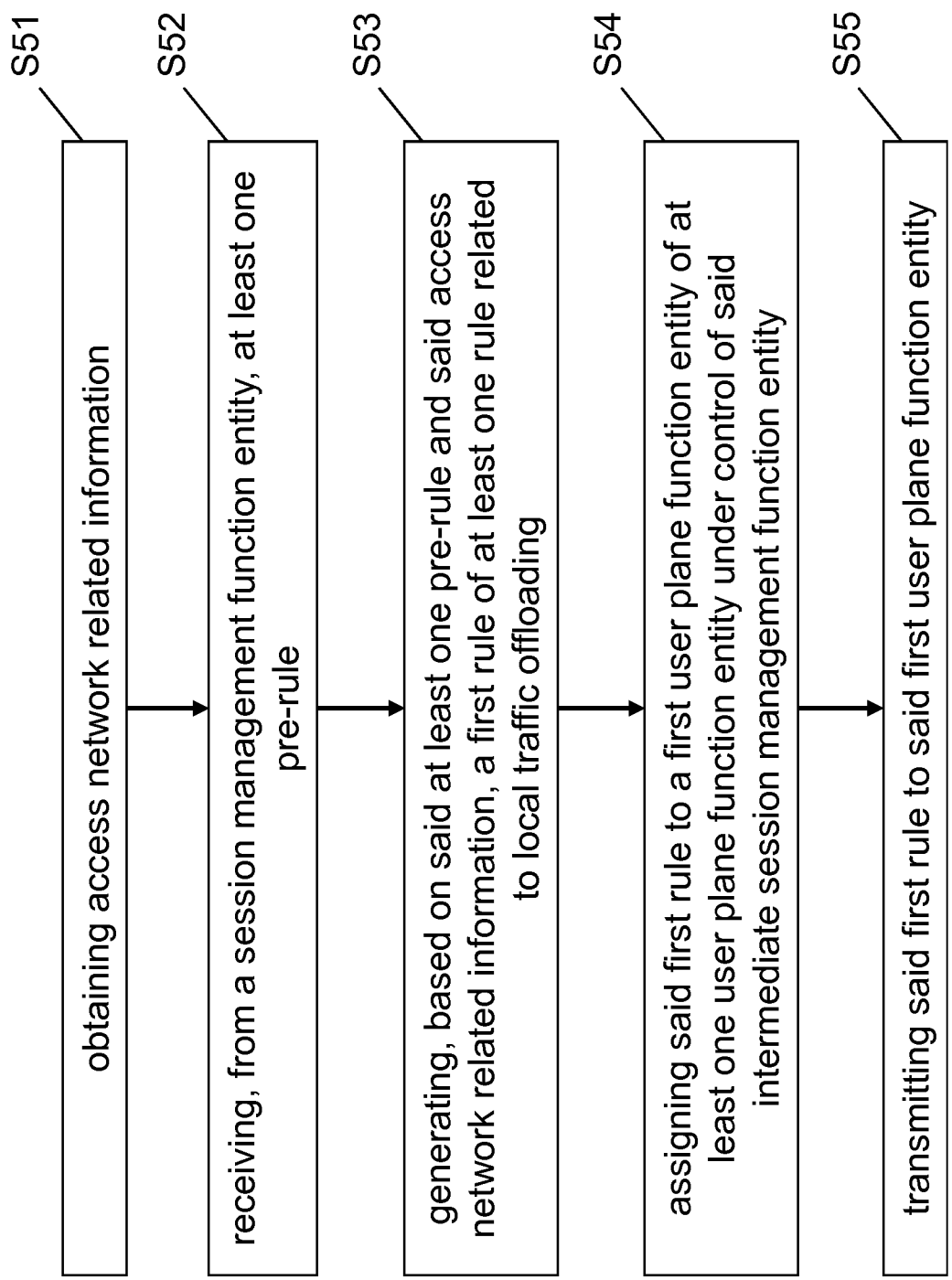
FIG. 5 is a schematic diagram of a procedure according to exemplary embodiments of the present invention.
Figure 6:
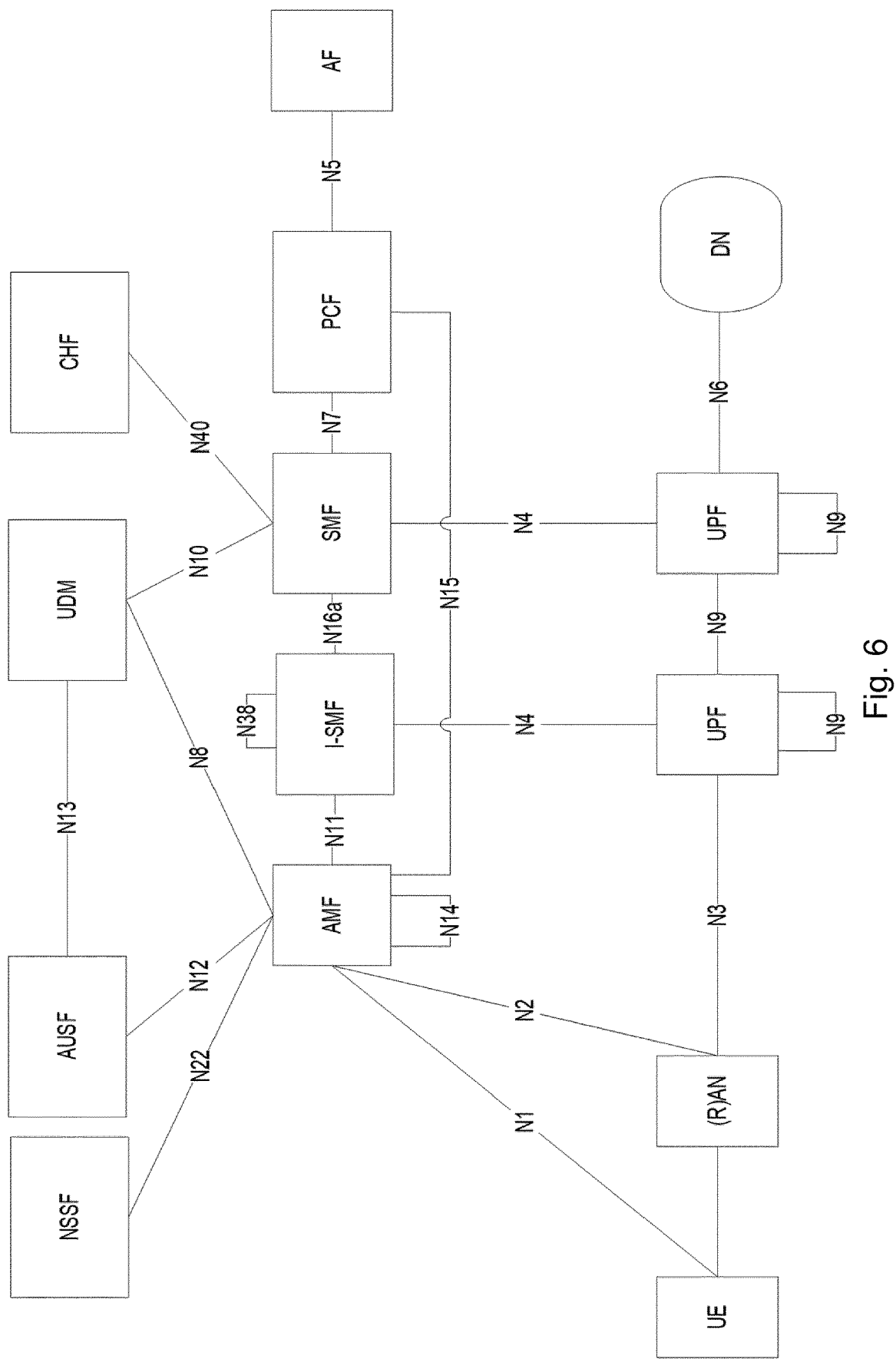
FIG. 6 shows a schematic diagram of an example of a system environment with respective interfaces between respective network entities.
Figure 7:
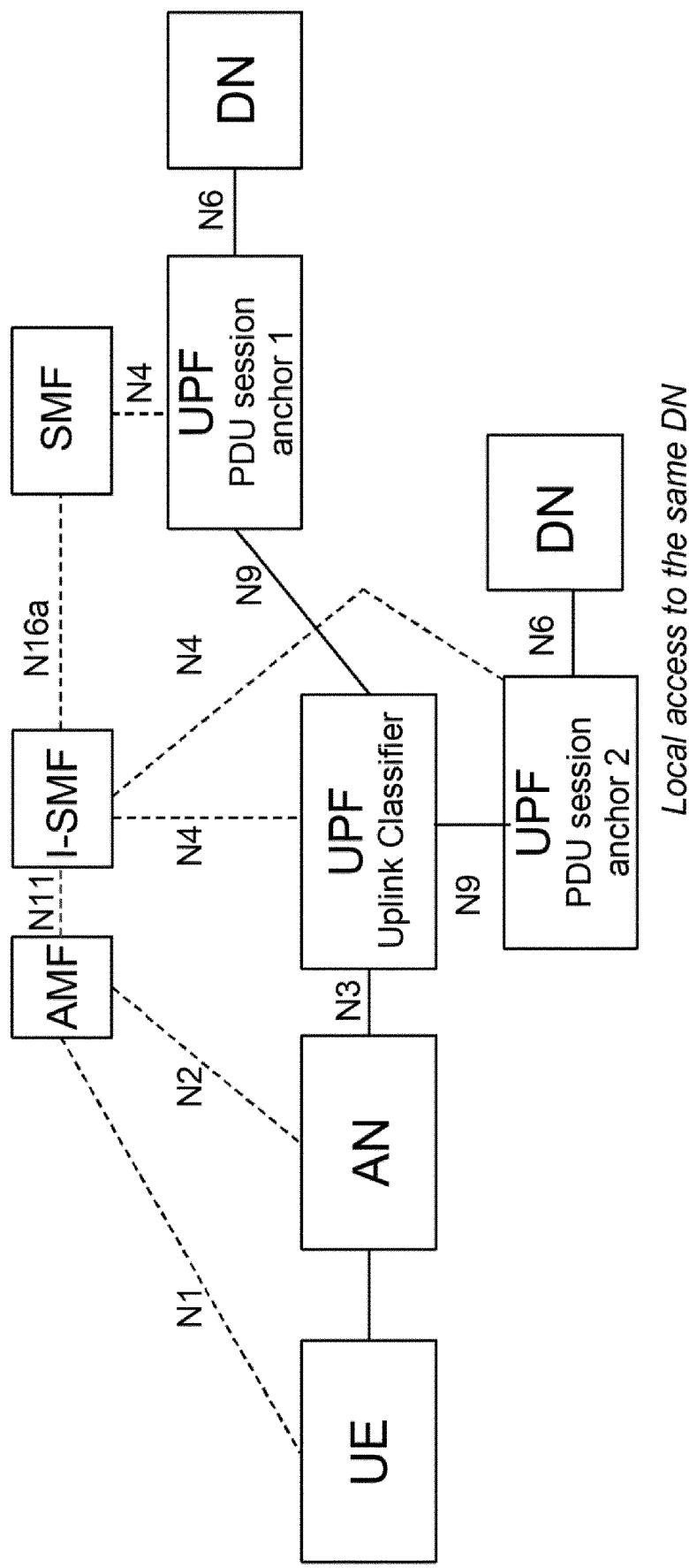
FIG. 7 shows a schematic diagram of an example of a system environment with respective interfaces between respective network entities.
Figure 8:
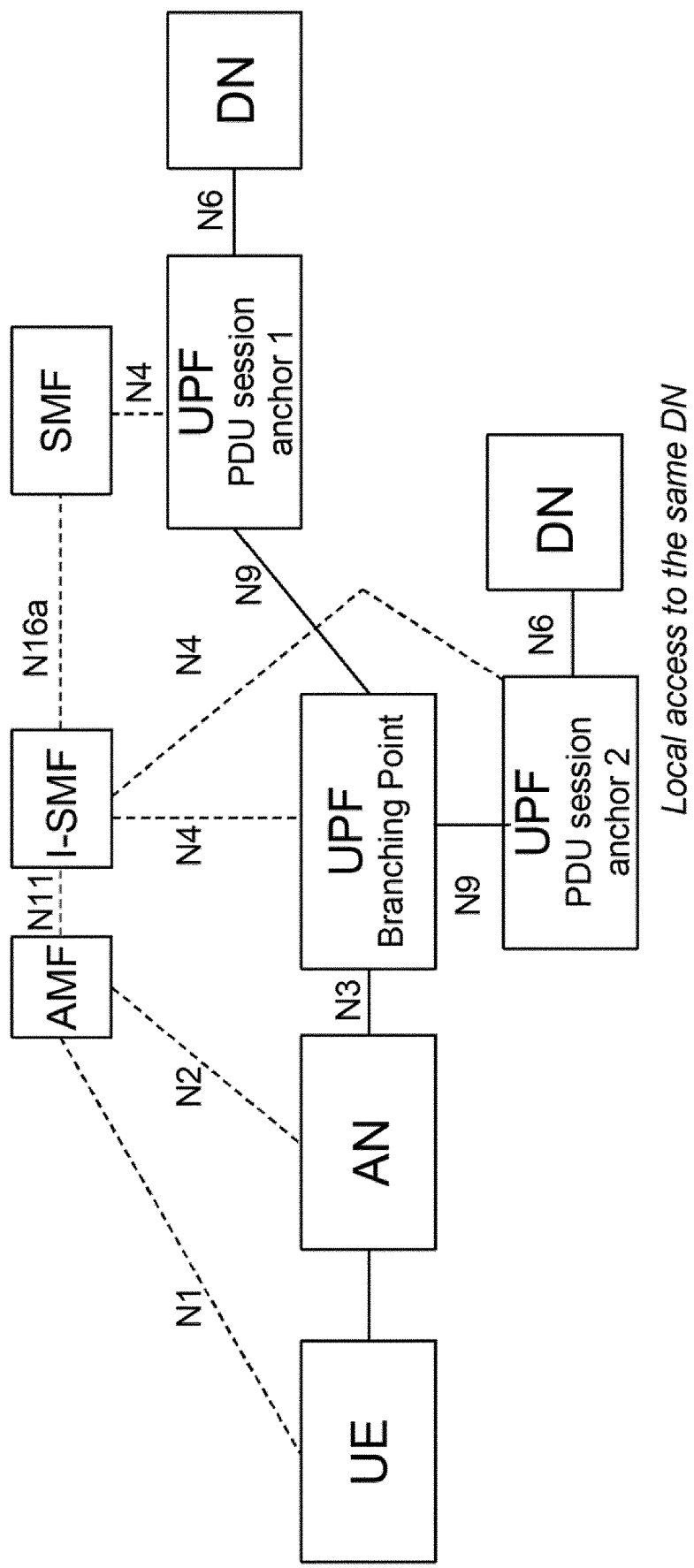
FIG. 8 shows a schematic diagram of an example of a system environment with respective interfaces between respective network entities.

FIG. 3 is a block diagram illustrating an apparatus according to exemplary embodiments of the present invention. The apparatus may be a network node 30 such as an intermediate session management function entity comprising an obtaining circuitry 31, a receiving circuitry 32, a generating circuitry 33, an assigning circuitry 34, and a transmitting circuitry 35. The obtaining circuitry 31 obtains access network related information. The receiving circuitry 32 receives, from a session management function entity, at least one pre-rule. The generating circuitry 33 generates, based on said at least one pre-rule and said access network related information, a first rule of at least one rule related to local traffic offloading. The assigning circuitry 34 assigns said first rule to a first user plane function entity of at least one user plane function entity under control of said intermediate session management function entity. The transmitting circuitry 35 transmits said first rule to said first user plane function entity. FIG. 5 is a schematic diagram of a procedure according to exemplary embodiments of the present invention. The apparatus according to FIG. 3 may perform the method of FIG. 5 but is not limited to this method. The method of FIG. 5 may be performed by the apparatus of FIG. 3 but is not limited to being performed by this apparatus.

As shown in FIG. 5, a procedure according to exemplary embodiments of the present invention comprises an operation of obtaining (S51) access network related information, an operation of receiving (S52), from a session management function entity, at least one pre-rule, an operation of generating (S53), based on said at least one pre-rule and said access network related information, a first rule of at least one rule related to local traffic offloading, an operation of assigning (S54) said first rule to a first user plane function entity of at least one user plane function entity under control of said intermediate session management function entity, and an operation of transmitting (S55) said first rule to said first user plane function entity.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

Generally, when it is defined that at least one pre-rule is received, this also includes that more than one pre-rule, i.e., a plurality of pre-rules or a set of pre-rules is received. Further, when it is defined that a first rule is generated, assigned, and/or transmitted, this also includes that more than one rule, i.e., a plurality of rules or a set of rules is generated, assigned, and/or transmitted.

According to exemplary embodiments of the present invention, each pre-rule of said at least one pre-rule is a respective pre-stage of a respective rule assuming that in relation to said local traffic offloading not more than one user plane function entity is under control of said intermediate session management function entity.

According to further exemplary embodiments of the present invention, each pre-rule of said at least one pre-rule is indicative of being said respective pre-stage of said respective rule.

According to further exemplary embodiments of the present invention, each pre-rule of said at least one pre-rule comprises a unique identifier.

According to further exemplary embodiments of the present invention, each pre-rule of said at least one pre-rule comprises references to information that said intermediate session management function entity is to determine locally in order to generate each respective rule to be transmitted to user plane function entities of said at least one user plane function entity under control of said intermediate session management function entity.

According to further exemplary embodiments of the present invention, in said assigning to said first user plane function entity, actual deployment of said at least one user plane function entity is considered.

According to a variation of the procedure shown in FIG. 5, exemplary additional operations are given, which are inherently independent from each other as such. According to such variation, an exemplary method according to exemplary embodiments of the present invention may comprise, an operation of generating, based on said at least one pre-rule and said access network related information, a second rule of said at least one rule related to local traffic offloading, an operation of assigning said second rule to a second user plane function entity of said at least one user plane function entity under control of said intermediate session management function entity, and an operation of transmitting said second rule to said second user plane function entity.

Generally, when it is defined that a second rule is generated, assigned, and/or transmitted, this also includes that more than one rule, i.e., a plurality of rules or a set of rules is generated, assigned, and/or transmitted.

According to further exemplary embodiments of the present invention, in said assigning to said second user plane function entity, actual deployment of said at least one user plane function entity is considered.

According to a variation of the procedure shown in FIG. 5, exemplary additional operations are given, which are inherently independent from each other as such. According to such variation, an exemplary method according to exemplary embodiments of the present invention may comprise an operation of receiving said access network related information from an access and mobility management function entity.

According to further exemplary embodiments of the present invention, each of said at least one user plane function entity supports at least one of a protocol data unit session anchor, an uplink classifier, and a branching point.

According to further exemplary embodiments of the present invention, each of said at least one rule related to local traffic offloading may be one of a packet detection rule, a forwarding action rule, a usage reporting rule, and a quality of service enforcement rule, but embodiments of the present invention may apply to other information related with User Plane control such as Tracing Control.

Exemplary embodiments of the present invention are described in more specific terms below in particular with reference to FIGS. 9 and 10.

Figure 9:
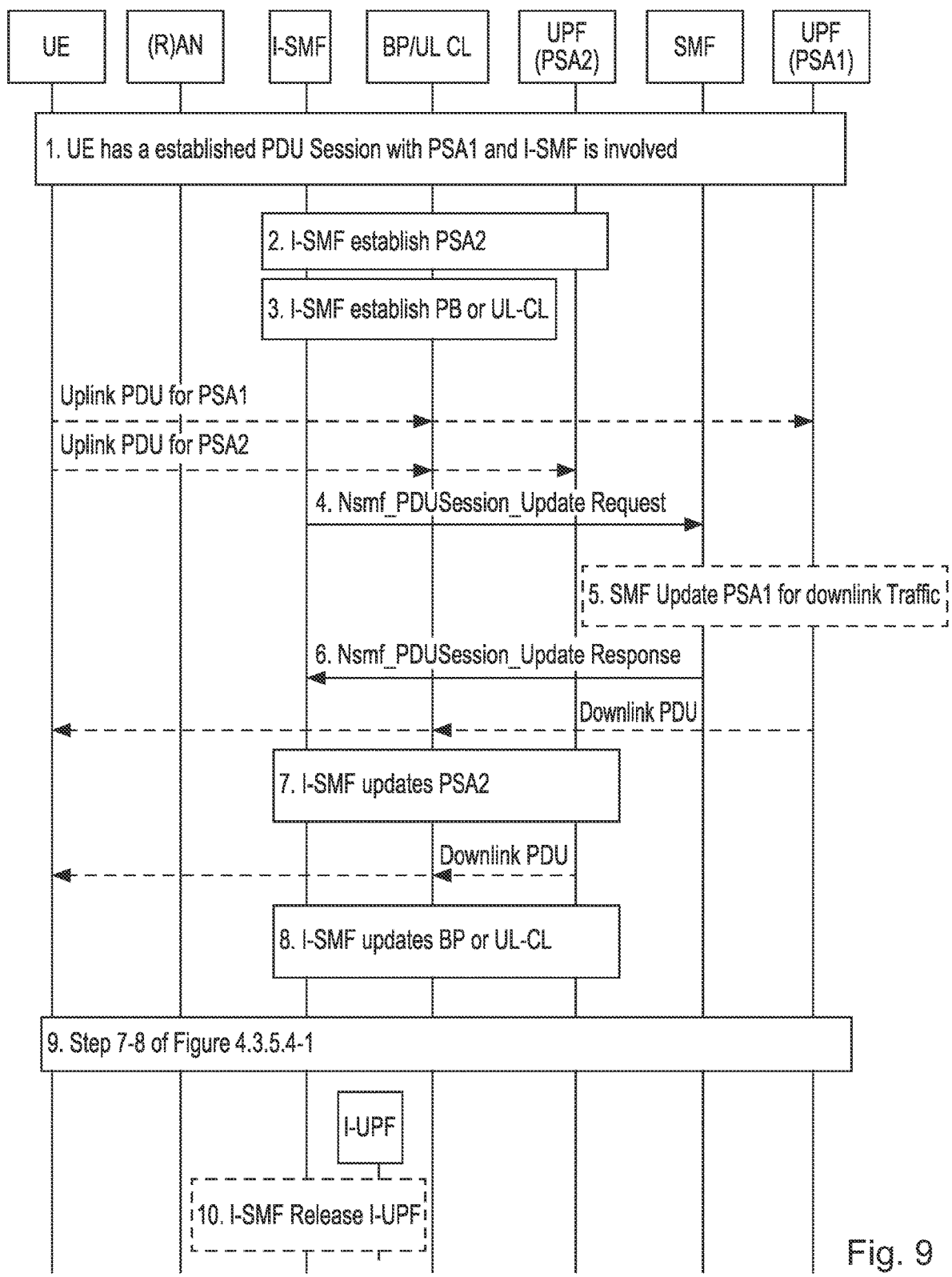
FIG. 9 shows a schematic diagram of signaling sequences according to exemplary embodiments of the present invention.

FIG. 9 shows a schematic diagram of signaling sequences according to exemplary embodiments of the present invention and in particular an addition of an additional PDU session anchor and BP or UL CL controlled by I-SMF.

Figure 10:
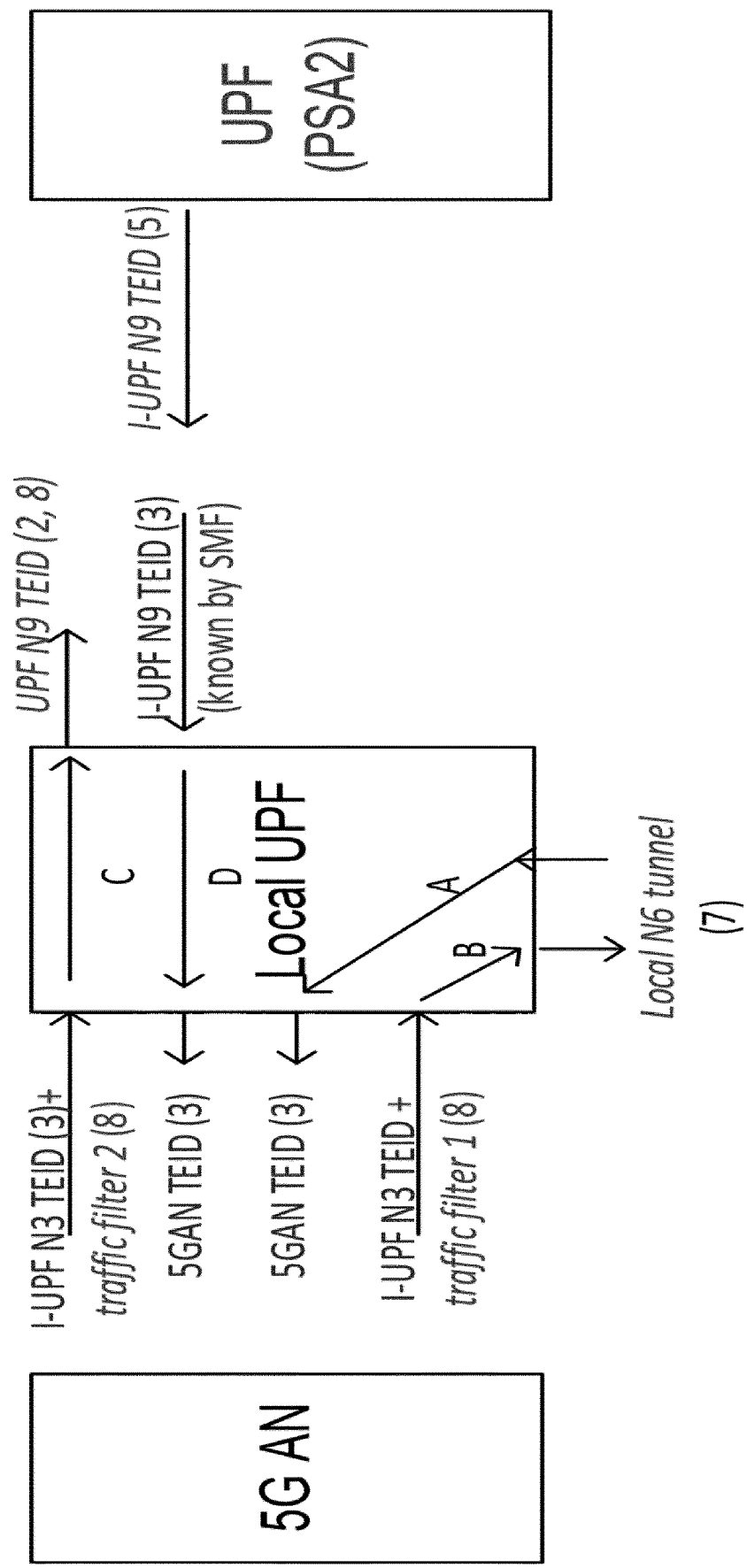
FIG. 10 shows a schematic diagram of an example of a system environment with signaling variants according to exemplary embodiments of the present invention.

FIG. 10 shows a schematic diagram of an example of a system environment with signaling variants according to exemplary embodiments of the present invention and in particular data to configured in local UPF (PSA2 and UL CL/BP).

In detail, subsequently procedure according to exemplary embodiments of the present invention to add a PDU session anchor and BP or UL CL controlled by I-SMF for an established PDU Session is explained.

In step 1 of FIG. 9, the UE has an established PDU Session with an UPF including the PDU session anchor 1 (PSA1), which is controlled by the SMF. The I-SMF and an I-UPF controlled by the I-SMF have already been inserted for the PDU Session.

When the I-SMF is inserted, the I-SMF provides the DNAI list it supports to the SMF. Based on the DNAI list information received from the I-SMF, the SMF provides location information for local traffic steering to I-SMF e.g. immediately or when (a) new or updated or removed PCC rule(s) is/are received. This location information for local traffic steering indicates to the I-SMF the list of DNAI(s) to be considered for local traffic offload within the PDU session.

An indication of whether multi-homing is possible may also be provided to the I-SMF, and the I-SMF uses this information to decide whether multi-homing is used for the PDU session.

In step 2 of FIG. 9, at some point in time, using the location information for local traffic steering received from the SMF, the I-SMF decides to establish a new PDU session anchor e.g. due to UE mobility. The I-SMF selects a UPF and establishes, using N4, the new PDU session anchor 2 (PSA2) of the PDU session.

During this step 2 of FIG. 9, the core network (CN) tunnel info of the local N9 termination on the PSA2 may be determined.

In case that IPv6 multi-homing applies to the PDU Session, a new IPv6 prefix corresponding to PSA2 is allocated by the I-SMF or by the UPF supporting the PSA2.

In step 3 of FIG. 9, the I-SMF may select a UPF acting as UL CL or BP and replace the current I-UPF.

If a new UPF acting as UL CL/BP is selected (i.e. the existing I-UPF is replaced), the I-SMF uses N4 establishment to provide the 5G AN tunnel info, the PSA1 and the PSA2 CN tunnel info to the new UPF.

If the BP or UL CL and the PSA2 are co-located in a single UPF, then steps 2 and 3 of FIG. 9 are merged according to exemplary embodiments of the present invention.

In step 4 of FIG. 9, the I-SMF invokes an Nsmf_PDUSession_Update request (indication of UL CL or BP insertion, IPv6 prefix @PSA2, DNAI(s) supported by PSA2, DL tunnel info of UL CL/BP) to SMF. Whether the UL CL/BP and PSA2 are supported by the same UPF is transparent to the SMF.

The I-SMF informs the SMF that a UL/CL or BP is inserted, and the I-SMF provides DNAI(s) supported by PSA2 to the SMF. The DL tunnel info of UL CL/BP is provided to SMF in case a new UPF is selected to replace I-UPF in step 3 of FIG. 9.

In the case of multi-homing, the IPv6 prefix @PSA2 is also provided to the SMF. If the PCF has subscribed to the IP allocation/release event, the SMF performs a session management policy modification procedure to provide the new allocated IPv6 prefix to the PCF.

The DNAI(s) supported by PSA2 may be used by the SMF to determine which PCC rules are to be applied at UPF(s) controlled by the I-SMF.

In step 5 of FIG. 9, if a new DL tunnel info of UL CL/BP has been provided in step 4 of FIG. 9, the SMF updates the PSA1 via N4 with the CN tunnel info for the downlink traffic. After that, the downlink packets from PSA1 are sent to UE via the new UPF that acts as BP/UL CL. The SMF may also update the packet handling rules in PSA1, if some of traffic is to be moved to UPFs controlled by I-SMF.

As shown in step 6 of FIG. 9, according to exemplary embodiments of the present invention, the SMF responds to the I-SMF with an Nsmf_PDUSession_Update response ("N4 information for local traffic switching"). The SMF generates N4 information for local traffic switching based on PCC rules and CHF requests that are to be enforced by UPFs controlled by the I-SMF.

Here, the N4 information for local traffic switching corresponds to N4 rules (PDR, FAR, URR, QER, and potentially other rules) with identifiers allowing the SMF to later modify or delete these rules.

The N4 information for local traffic switching considers an unique UPF controlled by the I-SMF leaving it up to the I-SMF to split up the information between the different actual UPF(s) it is controlling.

The N4 information for local traffic switching contains references to information as the 5G AN tunnel info that the SMF does not know and that the I-SMF needs to determine and add to build/generate actual rules sent to the UPF(s).

In other words, the SMF actually generates pre-rules (e.g. "N4 information for local traffic switching") based on the policy related information (e.g. PCC rules) and said charging related information (e.g. CHF requests). Each pre-rule is considered as a pre-stage of a respective rule (to be finished/generated by the I-SMF). Here, pre-rule particularly means a "semi-finished" rule or a "partly-generated" rule, i.e. a rule which is generated as complete as possible with the known information but without the information needed from the AN. In other words, the pre-rule corresponds to a rule (e.g. PDR, FAR, URR, QER, and potentially other rules) which is incompletely generated without considering the information needed from the AN and in particular without information in relation to deployment of involved UPF(s).

The I-SMF uses the N4 information for local traffic switching received from the SMF as well as 5G AN tunnel info received from the 5G AN via the AMF to determine N4 rules to send to the UPF(s) it is controlling.

As an example, the SMF may send to I-SMF basically two sub-sets of pre-rules (that correspond a virtual unique UPF).

A first sub-set of pre-rules may relate to UL traffic and may thus correspond to a PDR (traffic filters to identify traffic to be offloaded within traffic coming from the 5G AN) referring to FAR (to route the detected towards a local N6), URR (to monitor traffic) and QER.

A second sub-set of pre-rules set may relate to DL traffic and may thus correspond to a PDR (traffic filters to identify all traffic coming from the local N6 and that corresponds to the UE) referring to FAR (to route towards the 5G AN), URR (to monitor traffic) and QER.

From these sub-sets of pre-rules the I-SMF generates the actual rules to be sent to the local UPF.

In particular, the first sub-set of pre-rules (uplink (UL) traffic) may map to the UPF acting as UL CL/BP, wherein the resulting rules are generated also under consideration of AN information.

Further, the second sub-set of pre-rules (downlink (DL) traffic) may map to the UPF acting as PSA, wherein the resulting rules are generated also under consideration of AN information.

However, the present invention is not limited to such distinction between sub-sets. In particular, the SMF may generate and transmit one unique set of pre-rules (at least one pre-rule), while the rule generation by the I-SMF for both UPFs (in case of two controlled UPFs) is based on the one unique set of pre-rules (at least one pre-rule), and the rule generation by the I-SMF for the UPF (in case of one controlled UPF) is based on the one unique set of pre-rules (at least one pre-rule) as well.

In step 7 of FIG. 9, according to exemplary embodiments of the present invention, the I-SMF updates the PSA2 via N4 providing N4 rules determined in step 6 of FIG. 9. The I-SMF also provides the BP or UL CL CN tunnel info for DL traffic in case the PSA2 and the UL CL/BP are supported by different UPF(s).

In step 8 of FIG. 9, according to exemplary embodiments of the present invention, the I-SMF updates the BP or UL CL via N4 providing N4 rules determined in step 6 of FIG. 9.

In case the BP or UL CL and the PSA2 are co-located in a single UPF, according to exemplary embodiments of the present invention steps 7 and 8 of FIG. 9 are merged.

In step 9 of FIG. 9, same as the steps 7-8 of clause 4.3.5.4 of TS 23.502 are performed. In the case of IPv6 multi-homing PDU Session, the SMF notifies the UE of the IPv6 prefix @PSA2 and updates the UE with routing rule.

In step 10 of FIG. 9, if a new UPF is selected to replace I-UPF in step 3 of FIG. 9, the I-SMF uses N4 release to remove the I-UPF of the PDU session. The I-UPF releases resources for the PDU session.

The SMF behavior according to exemplary embodiments of the present invention assumes that the PSA2 and UL CL/BP are hosted in a single UPF as the SMF does not need to know whether the I-SMF has picked one or two UPF(s) to host the PSA2 and UL CL/BP functionalities.

The Local UPF (fulfilling/supporting the PSA2 and UL CL/BP roles) is configured as shown in the FIG. 10.

Here, the information
"traffic filter 2 (8)",
"traffic filter 1 (8)",
"Local N6 tunnel (7)",
"UPF N9 TEID (2, 8)", and
"I-UPF N9 TEID (5)"
is coming from the SMF, and the information
"I-UPF N3 TEID (3)",
"5GAN TEID (3),
"I-UPF N3 TEID", and
"I-UPF N9 TEID (3) (known by SMF)
is determined by the I-SMF (e.g. received by I-SMF from the 5G AN via the AMF), and thus corresponds.

Further, in FIG. 10, an arrow entering in the I-UPF corresponds to a PDR (traffic filter), while an arrow leaving the I-UPF corresponds to a FAR.

Finally, the signs in brackets ("( )") indicate the step in FIG. 9 where the information is configured.

In step 6 of FIG. 9, the SMF retrieves which PCC rule to apply and determines the corresponding
traffic forwarding to the local application,
traffic filters for the UE traffic,
charging related information, usage monitoring information, etc.

As discussed above, according to exemplary embodiments of the present invention, the SMF determines N4 information to apply considering that the local UPF(s) controlled by the I-SMF correspond to a unique UPF (if this is not true this is the matter of the I-SMF).

The SMF provides
A (see FIG. 10) a DL PDR with PDR filter (local N6 side) which is local N6 tunnel information (retrieved from the PCC rule).
This PDR refers to:
   a. a FAR (access side) where the Fully Qualified Tunnel Endpoint Identifier (F-TEID) has the value "local value to be assigned (as an example for references to information that said intermediate session management function entity is to determine locally in order to generate said respective rule to be transmitted to user plane function entities under control of said intermediate session management function entity)" (by the I-SMF based on signaling exchange with the 5G AN), and
   b. relevant URR and QER defined by the SMF.

The SMF further provides, according to exemplary embodiments of the present invention,
B (see FIG. 10) an UL PDR with PDR filter (access side) which is where the F-TEID has the value "local value to be assigned (as another example for references to information that said intermediate session management function entity is to determine locally in order to generate said respective rule to be transmitted to user plane function entities under control of said intermediate session management function entity)" (by the I-SMF based on signaling exchange with the 5G AN) coupled with traffic filtering information retrieved from the PCC rule.
This PDR refers to:
   a. a FAR (local N6 side) with local N6 tunnel information (retrieved from the PCC rule), and
   b. relevant URR and QER defined by the SMF.

The SMF further provides, according to exemplary embodiments of the present invention,
C (see FIG. 10) an UL PDR with PDR filter (access side) which is where the F-TEID has the value "local value to be assigned (as another example for references to information that said intermediate session management function entity is to determine locally in order to generate said respective rule to be transmitted to user plane function entities under control of said intermediate session management function entity)" (by the I-SMF based on signaling exchange with the 5G AN) coupled with traffic filtering information retrieved from the PCC rule.
This PDR refers to:
   a. a FAR (network side) with a F-TEID corresponding to an UPF managed by the SMF, and
   b. relevant URR and QER defined by the SMF.

The SMF further provides
D (see FIG. 10) a DL PDR with PDR filter (network side) which means that F-TEID has the value it received earlier (step 4 of FIG. 9) from the I-SMF.

This PDR refers to:
   a. according to exemplary embodiments of the present invention, a FAR (access side) where the F-TEID has the value "local value to be assigned (as another example for references to information that said intermediate session management function entity is to determine locally in order to generate said respective rule to be transmitted to user plane function entities under control of said intermediate session management function entity)" (by the I-SMF based on signalling exchange with the 5G AN), and
   b. relevant URR and QER defined by the SMF.

The information above tagged as "local value to be assigned" corresponds to the sentence "N4 information for local traffic switching contains references to information as the 5G AN Tunnel Info that the SMF does not know and that the I-SMF needs to determine and add to build actual rules sent to the UPF(s)" of step 6 of FIG. 9 describing exemplary embodiments of the present invention.

The transitions between UP ACTIVE and UP INACTIVE for the PDU session (e.g. due to transitions between CM-CONNECTED and CM-ACTIVE for the UE) are handled locally by the I-SMF.

The HOs within the area of the DNAI are locally handled by the I-SMF.

In particularly specific terms, the behavior of involved entities according to exemplary embodiments of the may be specified/defined in existing technical specifications, e.g. in 3GPP TS 23.501 and TS 23.502, embedded in already existing definitions, as follows.

In 3GPP TS 23.501, the interaction between I-SMF and SMF for the support of traffic offload by UPF controlled by the I-SMF may be defined as follows:

This clause applies only in case of non-roaming or LBO roaming as control of UL CL/BP in VPLMN is not supported in HR case. It applies for the architectures described in clauses 5.34.4 and 5.34.5

When the I-SMF is inserted into a PDU Session, e.g. during PDU Session establishment or due to UE mobility, the I-SMF provides the DNAI list it supports to the SMF. Based on the DNAI list information received from I-SMF, the SMF may provide location information for local traffic steering to the I-SMF e.g. immediately or when a new or updated or removed PCC rule(s) is/are received. The location information for local traffic steering is derived from PCC rules and refers to the DNAI(s) of interest for the PDU Session that are served by the I-SMF.

The I-SMF is responsible for the insertion, modification and removal of UPF(s) to ensure local traffic steering. The SMF does not need to have access to local configuration or NRF output related with UPF(s) controlled by I-SMF. Based on the location information for local traffic steering and UE location the I-SMF may select UPF(s) acting as UL CL/BP and/or PDU Session Anchor based on selected DNAI, and insert these UPF(s) into the data path of the PDU Session. When a UL CL/BP has been inserted, changed or removed, the I-SMF indicates to the SMF that traffic offload has been inserted, updated or removed for a DNAI, providing also the IPv6 prefix that has been allocated in case a new IPv6 prefix has been allocated for the PDU Session.

From now on the SMF and I-SMF interactions entail:
Notifying the UE with the new Prefix (multi-Homing case): the SMF is responsible of issuing Router advertisement to the UE including the priorities provided to the UE to select among the prefixes related with the PDU Session.

N4 interactions related with traffic offloading. The SMF generates N4 information for local traffic switching based on PCC rules and CHF requests that will be enforced by UPFs controlled by I-SMF. The N4 information for local traffic switching may correspond to N4 rules (PDR, FAR, URR, QER, etc.) with identifiers allowing the SMF to later modify or delete these rules. N4 information for local traffic switching considers a unique UPF controlled by the I-SMF leaving it up to the I-SMF to split up the information between the different actual UPF(s) it is controlling. N4 information for local traffic switching may indicate information (as the 5G AN Tunnel Info) that the SMF does not know and that the I-SMF needs to determine to build actual rules sent to the UPF(s).

NOTE 1: The list of attributes that the that the SMF lets the I-SMF to determine to build actual N4 rules sent to the UPF(s) is defined in class 5.8.2.11. Attributes like the CN tunnel info are determined based on information received from the 5G AN via the AMF; other attributes (e.g. network instance at the access side or Transport level marking) can be determined based on local mapping configuration in the I-SMF.

Receiving N4 notifications related with traffic usage reporting: the I-SMF forwards to the SMF N4 information corresponding to UPF notifications related with traffic usage reporting; the SMF aggregates and constructs usage reports towards PCF/CHF.

Sending Trace Requirements to the I-SMF; the I-SMF may provide Trace Requirements on the N4 interface towards the UPF(s) it is controlling NOTE 2: How the SMF decides what traffic steering and enforcement actions are enforced in UPF(s) controlled by I-SMF is left for implementation. The I-SMF is responsible of the N4 interface towards the local UPF(s) including
   the usage of AN Tunnel Info received from the 5G AN via the AMF in order to build PDR and FAR,
   the choice (by SMF, by UPF) of the CN Tunnel Info at the UPF controlled by the I-SMF,
   the control of UPF actions when the UP of the PDU Session becomes INACTIVE,
   the sending of end markers at Hand-Over not involving a change of the UPF interfacing an UPF not controlled by the I-SMF.

The N4 rules (e.g. PDR, FAR) exchanged between I-SMF and SMF are not associated with a N4 Session ID but are associated with a N16a association.

In 3GPP TS 23.501, the packet detection rule may be defined as follows:

The following table describes the Packet Detection Rule (PDR) containing information required to classify a packet arriving at the UPF. Every PDR is used to detect packets in a certain transmission direction, e.g. UL direction or DL direction.

In 3GPP TS 23.501, the table in relation to attributes within the packet detection rule may be defined as follows:

| Attribute | Description | Comment |
| --- | --- | --- |
| N4 Session ID | Identifies the N4 session associated to this PDR. NOTE 5 | |
| Rule ID | Unique identifier to identify this rule | |
| Precedence | Determines the order, in which the detection information of all rules is applied | |

-continued

| Attribute | | Description | Comment |
|---|---|---|---|
| Packet detection information | Source interface | Contains the values "access side", "core side", "SMF", "N6-LAN", "5G LAN internal", "5G LAN Nx" | Combination of UE IP address (together with Network instance, if necessary), CN tunnel info, packet filter set, application ID, Ethernet PDU Session Information and QFI are used for traffic detection. Source interface identifies the interface for incoming packets where the PDR applies, e.g. from access side (i.e. up-link), from core side (i.e. down-link), from SMF, from N6-LAN (i.e. the DN or the local DN), from "5G LAN internal" (i.e. local switch), or from "5G LAN Nx" (i.e. Nx interface). |
| | UE IP address | One IPv4 address and/or one IPv6 prefix with prefix length (NOTE 3) | |
| | Network instance (NOTE 1) | Identifies the Network instance associated with the incoming packet. NOTE 4. | |
| | CN tunnel info | CN tunnel info on N3, N9 interfaces, i.e. F-TEID. NOTE 4; | |
| | Packet Filter Set | Details see clause 5.7.6, TS 23.501. | |
| | Application ID | | |
| | QoS Flow ID | Contains the value of 5QI or non-standardized QFI | |
| | Ethernet PDU Session Information | Refers to all the (DL) Ethernet packets matching an Ethernet PDU session, as further described in clause 5.6.10.2 and in TS 29.244 [65]. | |
| | Framed Route Information | Refers to Framed Routes defined in clause 5.6.14 | Details like all the combination possibilities on N3, N9 interfaces are left for stage 3 decision. |
| Outer header removal | | Instructs the UP function to remove one or more outer header(s) (e.g. IP + UDP + GTP, IP + possibly UDP, VLAN tag), from the incoming packet. | Any extension header shall be stored for this packet. |
| Forwarding Action Rule ID (NOTE 2) | | The Forwarding Action Rule ID identifies a forwarding action that has to be applied. | |
| Multi-Access Rule ID (NOTE 2) | | The Multi-Access Rule ID identifies an action to be applied for handling forwarding for a MA PDU Session. | |
| List of Usage Reporting Rule ID(s) | | Every Usage Reporting Rule ID identifies a measurement action that has to be applied. | |
| List of QoS Enforcement Rule ID(s) | | Every QoS Enforcement Rule ID identifies a QoS enforcement action that has to be applied. | |

NOTE 1: Needed e.g. in case:
UPF supports multiple DNN with overlapping IP addresses;
UPF is connected to other UPF or AN node in different IP domains.
UPF "local switch" and Nx forwarding is used for different 5G LAN groups.
NOTE 2: Either a FAR ID or a MAR ID is included, not both.
NOTE 3: The SMF may provide an indication asking the UPF to allocate one IPv4 address and/or IPv6 prefix. When asking to provide an IPv6 Prefix the SMF provides also an IPv6 prefix length.
NOTE 4: When in the architecture defined in clause 5.34, the PDR is sent over N16a from SMF to I-SMF, This attribute may correspond to a value telling that the I-SMF is to locally determine its value in order to build the PDR rule sent to the actual UPF controlled by the I-SMF. This is further defined in clause 5.34.6
NOTE 5: In the architecture defined in clause 5.34, the rules exchanged between I-SMF and SMF are not associated with a N4 Session ID but are associated with a N16a association In 3GPP TS 23.501, the forwarding action rule may be defined as follows:

The following table describes the Forwarding Action Rule (FAR) that defines how a packet shall be buffered, dropped or forwarded, including packet encapsulation/decapsulation and forwarding destination.

In 3GPP TS 23.501, the table in relation to attributes within forwarding action rule may be defined as follows:

| Attribute | Description | Comment |
|---|---|---|
| N4 Session ID | Identifies the N4 session associated to this FAR. | NOTE 9 |
| Rule ID | Unique identifier to identify this information. | |
| Action | Identifies the action to apply to the packet | Indicates whether the packet is to be forwarded, duplicated, dropped or buffered. When action indicates forwarding or duplicating, a number of additional attributes are included in the FAR. For buffering action, a Buffer Action Rule is also included. |
| Network instance (NOTE 2) | Identifies the Network instance associated with the outgoing packet (NOTE 1). | NOTE 8 |
| Destination interface (NOTE 3) (NOTE 7) | Contains the values "access side", "core side", "SMF", "N6-LAN", "5G LAN internal" or "5G LAN Nx". | Identifies the interface for outgoing packets towards the access side (i.e. down-link), the core side (i.e. up-link), the SMF, the N6-LAN (i.e. the DN or the local DN), to 5G LAN internal (i.e. local switch), or to 5G LAN Nx (i.e. Nx interface). |
| Outer header creation (NOTE 3) | Instructs the UP function to add an outer header (e.g. IP + UDP + GTP + QFI, VLAN tag), IP + possibly UDP to the outgoing packet. | Contains the CN tunnel info (NOTE 8), N6 tunnel info or AN tunnel info of peer entity (e.g. NG-RAN, another UPF, SMF, local access to a DN represented by a DNAI). Any extension header stored for this packet shall be added. |
| Send end marker packet(s) (NOTE 2) | Instructs the UPF to construct end marker packet(s) and send them out as described in clause 5.8.1. | This parameter should be sent together with the "outer header creation" parameter of the new CN tunnel info. NOTE 8 |
| Transport level marking (NOTE 3) | Transport level packet marking in the uplink and downlink, e.g. setting the DiffServ Code Point. | NOTE 8 |
| Forwarding policy (NOTE 3) | Reference to a preconfigured traffic steering policy or http redirection (NOTE 4). | Contains one of the following policies identified by a TSP ID: an N6-LAN steering policy to steer the subscriber's traffic to the appropriate N6 service |

| Attribute | Description | Comment |
|---|---|---|
| | | functions deployed by the operator, or a local N6 steering policy to enable traffic steering in the local access to the DN according to the routing information provided by an AF as described in clause 5.6.7. or a Redirect Destination and values for the forwarding behaviour (always, after measurement report (for termination action "redirect")). |
| Request for Proxying in UPF | Indicates that the UPF shall perform ARP proxying and/or IPv6 Neighbour Solicitation Proxying as specified in clause 5.6.10.2. | Applies to the Ethernet PDU Session type. |
| Container for header enrichment (NOTE 2) | Contains information to be used by the UPF for header enrichment. | Only relevant for the uplink direction. |
| Buffering Action Rule (NOTE 5) | Reference to a Buffering Action Rule ID defining the buffering instructions to be applied by the UPF (NOTE 6) | |

NOTE 1: Needed e.g. in case:
UPF supports multiple DNN with overlapping IP addresses;
UPF is connected to other UPF or NG-RAN node in different IP domains;
UPF "local switch" and Nx forwarding is used for different 5G LAN groups.
NOTE 2: These attributes are required for FAR action set to forwarding.
NOTE 3: These attributes are required for FAR action set to forwarding or duplicating.
NOTE 4: The TSP ID is preconfigured in the SMF, and included in the FAR according to the description in clauses 5.6.7 and 6.1.3.14 of 23.503 [45] for local N6 steering and 6.1.3.14 of 23.503 [45] for N6-LAN steering. The TSP ID action is enforced before the Outer header creation actions.
NOTE 5: This attribute is present for FAR action set to buffering.
NOTE 6: The buffering action rule is created by the SMF and associated with the FAR in order to apply a specific buffering behaviour for DL packets requested to be buffered, as described in clause 5.8.3 and clause 5.2.4 in TS 29.244 [65].
NOTE 7: The use of "5G LAN Internal" instructs the UPF to send the packet back for another round of ingress processing using the active PDRs pertaining to another N4 session of the same 5G LAN. To avoid that the packet matches again the same PDR, it is assumed that the packet has been modified in some way (e.g. tunnel header has been removed, the packets being received from the source interface 5G LAN Internal of the same 5G LAN).
NOTE 8: When in architectures defined in clause 5.34, the FAR is sent over N16a from SMF to I-SMF, this attribute may correspond to a value telling that the I-SMF is to locally determine the attribute in order to build the FAR rule sent to the actual UPF controlled by the I-SMF. This is further defined in clause 5.34.6
NOTE 9: In the architecture defined in clause 5.34, the rules exchanged between I-SMF and SMF are not associated with a N4 Session ID but are associated with a N16a association In 3GPP TS 23.502, the addition of additional PDU session anchor and branching point or UL CL controlled by I-SMF may be defined as follows:

This clause describes a procedure to add a PDU Session Anchor and Branching Point or UL CL controlled by I-SMF.

1. UE has an established PDU Session with a UPF including the PDU Session Anchor 1, which is controlled by SMF. The I-SMF and an I-UPF controlled by I-SMF have already been inserted for the PDU Session.

When the I-SMF is inserted, the I-SMF provides the DNAI list it supports to SMF. Based on the DNAI list information received from I-SMF, the SMF provides location information for local traffic steering to I-SMF e.g. immediately or when a new or updated or removed PCC rule(s) is/are received. This location information for local traffic steering indicates to the I-SMF the list of DNAI(s) to be considered for local traffic offload within the PDU Session.

An indication of whether Multi-homing is possible is also provided to the I-SMF, and the I-SMF uses this information to decide whether multi-homing is used for the PDU Session.

2. At some point, using the location information for local traffic steering received from the SMF, the I-SMF decides to establish a new PDU Session Anchor e.g. due to UE mobility. The I-SMF selects a UPF and using N4 establishes the new PDU Session Anchor 2 of the PDU Session. During this step the CN Tunnel Info of the local N9 termination on the PSA2 may be determined,
In case of IPv6 multi-homing applies to the PDU Session, a new IPv6 prefix corresponding to PSA2 is allocated by the I-SMF or by the UPF supporting the PSA2.

3. The I-SMF may select a UPF acting as UL CL or BP and replace the current I-UPF.

If a new UPF acting as UL CL/BP is selected (i.e. the existing I-UPF is replaced), the I-SMF uses N4 establishment to provide the 5G AN Tunnel Info, the PSA1 and PSA2 CN Tunnel Info to the new UPF.
NOTE 1: If the Branching Point or UL CL and the PSA2 are co-located in a single UPF then steps 2 and 3 can be merged.

4. The I-SMF invokes Nsmf_PDUSession_Update Request (Indication of UL CL or BP insertion, IPv6 prefix @PSA2, DNAI(s) supported by PSA2, DL Tunnel Info of UL CL/BP) to SMF. Whether the UL CL/BP and PSA2 are supported by the same UPF is transparent to the SMF.

The I-SMF informs the SMF that a ULCL or BP is inserted, the I-SMF provides DNAI(s) supported by PSA2 to the SMF. The DL Tunnel Info of UL CL/BP is provided to SMF in case the a new UPF is selected to replace I-UPF in step 3.
In the case of multi-homing, the IPv6 prefix @PSA2 is also provided to SMF. If the PCF has subscribed to the IP allocation/release event, the SMF performs the Session Management Policy Modification procedure as defined in clause 4.16.5 to provide the new allocated IPv6 prefix to the PCF.
The DNAI(s) supported by PSA2 may be used by the SMF to determine which PCC rules are to be applied at UPF(s) controlled by the I-SMF.

5. If a new DL Tunnel Info of UL CL/BP has been provided in step 4, the SMF updates the PSA1 via N4 with the CN Tunnel Info for the downlink traffic. Now the downlink packets from PSA1 is sent to UE via the new UPF which act as BP/UL CL. The SMF may also update the packet handling rules in PSA1 if some of traffic is to be moved to UPFs controlled by I-SMF.

6. The SMF responds I-SMF with Nsmf_PDUSession_Update Response (N4 information for local traffic switching). The SMF generates N4 information for local traffic switching based on PCC rules and CHF requests that will be enforced by UPFs controlled by I-SMF. The N4 information for local traffic switching corresponds to N4 rules (PDR, FAR, URR, QER, etc.) with identifiers allowing the SMF to later modify or delete these rules. N4 information for local traffic switching considers an unique UPF controlled by the I-SMF leaving it up to the I-SMF to split up the information between the different actual UPF(s) it is controlling. N4 information for local traffic switching contains references to information as the 5G AN Tunnel Info that the SMF does not know and that the I-SMF needs to add to build actual rules sent to the UPF(s). If the CN Tunnel Info at the PSA1 has changed, the SMF may also provide its new value.

The I-SMF uses N4 information for local traffic switching received from the SMF as well as 5G AN Tunnel Info received from the 5G AN via the AMF to determine N4 rules to send to the UPF(s) it is controlling.

7. The I-SMF updates the PSA2 via N4 providing N4 rules determined in step 6. It also provides the Branching Point or UL CL CN Tunnel Info for downlink traffic in case the PSA2 and the UL CL/BP are supported by different UPF(s).

8. The I-SMF updates the Branching Point or ULCL via N4 providing N4 rules determined in step 6.

NOTE 2: In case the Branching Point or UL CL and the PSA2 are co-located in a single UPF then step 7 and step 8 can be merged.

9. Same as the steps 7-8 of clause 4.3.5.4 are performed: In the case of IPv6 multi-homing PDU Session, the SMF notifies the UE of the IPv6 prefix @PSA2 and updates the UE with routing rule.

10. If a new UPF is selected to replace I-UPF in step 3, the I-SMF uses N4 Release to remove the I-UPF of the PDU Session. The I-UPF releases resources for the PDU Session.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity/node (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 11:
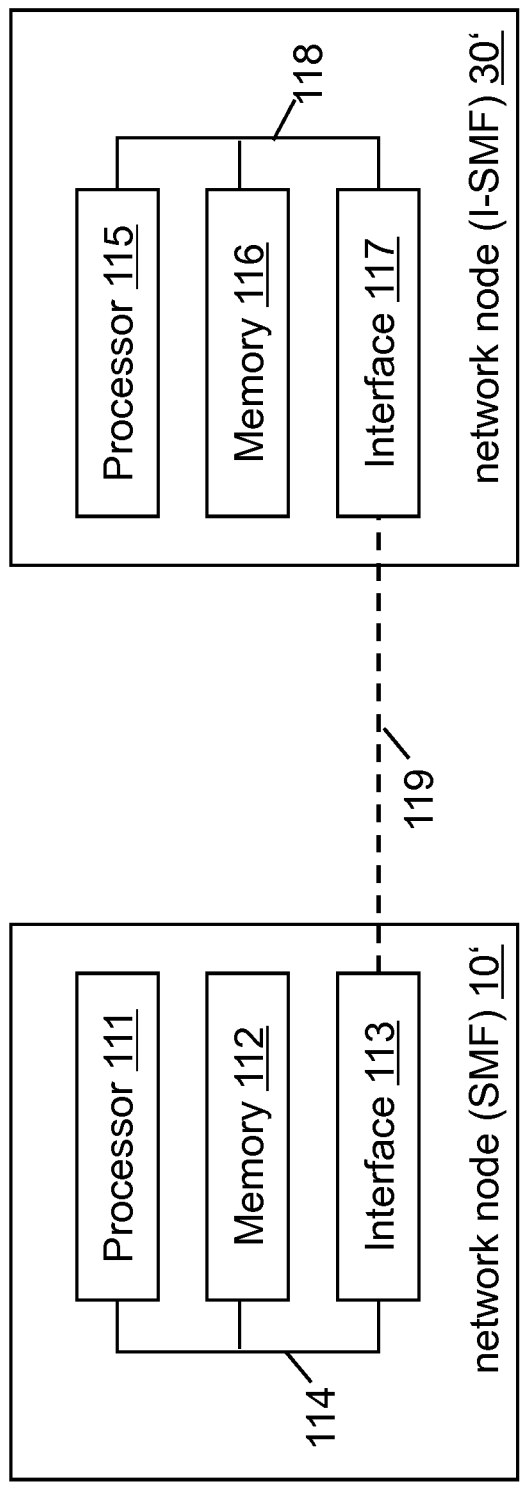
FIG. 11 is a block diagram alternatively illustrating apparatuses according to exemplary embodiments of the present invention.

In FIG. 11, an alternative illustration of apparatuses according to exemplary embodiments of the present invention is depicted. As indicated in FIG. 11, according to exemplary embodiments of the present invention, the apparatus (network node) 10' (corresponding to the network node 10) comprises a processor 111, a memory 112 and an interface 113, which are connected by a bus 114 or the like. Further, according to exemplary embodiments of the present invention, the apparatus ((network node) 30' (corresponding to the network node 30) comprises a processor 115, a memory 116 and an interface 117, which are connected by a bus 118 or the like, and the apparatuses may be connected via link 119, respectively.

The processor 111/115 and/or the interface 113/117 may also include a modem or the like to facilitate communication over a (hardwire or wireless) link, respectively. The interface 113/117 may include a suitable transceiver coupled to one or more antennas or communication means for (hardwire or wireless) communications with the linked or connected device(s), respectively. The interface 113/117 is generally configured to communicate with at least one other apparatus, i.e. the interface thereof.

The memory 112/116 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 111, at least one memory 112 including computer program code, and at least one interface 113 configured for communication with at least another apparatus. The processor (i.e. the at least one processor 111, with the at least one memory 112 and the computer program code) is configured to perform obtaining policy related information and charging related information (thus the apparatus comprising corresponding means for obtaining), to perform generating at least one pre-rule based on said policy related information and said charging related information, wherein each pre-rule of said at least one pre-rule being a respective pre-stage of a respective rule related to local traffic offloading with respect to user plane function entities under control of an intermediate session management function entity (thus the apparatus comprising corresponding means for generating), and to perform transmitting said at least one pre-rule to said intermediate session management function entity (thus the apparatus comprising corresponding means for transmitting).

According to further exemplary embodiments of the present invention, an apparatus representing the network node 30 comprises at least one processor 115, at least one memory 116 including computer program code, and at least one interface 117 configured for communication with at least another apparatus. The processor (i.e. the at least one processor 115, with the at least one memory 116 and the computer program code) is configured to perform obtaining access network related information (thus the apparatus comprising corresponding means for obtaining), to perform receiving, from a session management function entity, at least one pre-rule (thus the apparatus comprising corresponding means for receiving), to perform generating, based on said at least one pre-rule and said access network related information, a first rule of at least one rule or a first set of rules related to local traffic offloading (thus the apparatus comprising corresponding means for generating), to perform assigning said first rule or said first set of rules to a first user plane function entity of at least one user plane function entity under control of said intermediate session management function entity (thus the apparatus comprising corresponding means for assigning), and to perform transmitting said first rule to said first user plane function entity (thus the apparatus comprising corresponding means for transmitting).

For further details regarding the operability/functionality of the individual apparatuses, reference is made to the above description in connection with any one of FIGS. 1 to 10, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for local user plane function control. Such measures exemplarily comprise obtaining access network related information, receiving, from a session management function entity, at least one pre-rule, generating, based on said at least one pre-rule and said access network related information, a first rule of at least one rule related to local traffic offloading, assigning said first rule to a first user plane function entity of at least one user plane function entity under control of said intermediate session management function entity, and transmitting said first rule to said first user plane function entity.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
AN access network
AMF access and mobility management function
BP branching point
CHF charging function
CN core network
DL downlink
DN data network
DNAI data network access identifier
FAR forwarding action rule
F-TEID Fully Qualified Tunnel Endpoint Identifier
HO handover
I-SMF intermediate session management function
NF network function
NRF network repository function
PCC policy and charging control PCF policy control function
PDR packet detection rule
PDU protocol data unit
PLMN public land mobile network
PSA protocol data unit session anchor
QER quality of service enforcement rule
QoS quality of service
SM session management
SMF session management function
SSC session and service continuity
UE user equipment
UL uplink
UL CL uplink classifier
UPF user plane function
URR usage reporting rule

The invention claimed is:

1. A method of a session management function entity, comprising:
  obtaining policy related information and charging related information;
  generating a pre-rule based on said policy related information and said charging related information, wherein said pre-rule is a partly-generated rule of a N4 rule related to local traffic offloading with respect to at least one user plane function entity under control of an intermediate session management function entity, wherein said N4 rule is a packet detection rule, a forwarding action rule, a usage reporting rule, or a quality of service enforcement rule, and wherein said pre-rule comprises an indication that said intermediate session management function entity is to determine information that said intermediate session management function is to use with said pre-rule to generate said N4 rule; and
  transmitting said pre-rule to said intermediate session management function entity for generation of said N4 rule.

2. The method according to claim 1, wherein
  said generating said pre-rule is generated assuming that in relation to said local traffic offloading only one user plane function entity is under control of said intermediate session management function entity.

3. A method of an intermediate session management function entity comprising:
  receiving, from a session management function entity, a pre-rule, wherein the pre-rule is a partly-generated rule of a first N4 rule related to local traffic offloading with respect to at least one user plane function entity under control of said intermediate session management function entity, wherein said N4 rule is a packet detection rule, a forwarding action rule, a usage reporting rule, or a quality of service enforcement rule, and wherein said pre-rule comprises an indication that said intermediate session management function entity is to determine information that is to be used with said pre-rule to generate said N4 rule;
  determining the information that is to be used to generate said N4 rule;
  generating, based on said pre-rule and said information, said N4 rule related to local traffic offloading; and
  transmitting said N4 rule to said at least one user plane function entity.

4. An apparatus comprising:
  at least one processor; and
  at least one memory including computer program code,
  the at least one memory and the computer program code configured to, with the at least one processor, cause the apparatus at least to:
  obtain policy related information and charging related information;
  generate a pre-rule based on said policy related information and said charging related information, wherein said pre-rule is a partly-generated rule of a N4 rule related to local traffic offloading with respect to at least one user plane function entity under control of an intermediate session management function entity, wherein said N4 rule is a packet detection rule, a forwarding action rule, a usage reporting rule, or a quality of service enforcement rule, and wherein said pre-rule comprises an indication that said intermediate session management function entity is to obtain information that is to be used to generate said N4 rule to be transmitted to said at least one user plane function entity under control of said intermediate session management function entity; and
  transmit said pre-rule to said intermediate session management function entity for generation of said N4 rule.

5. The apparatus according to claim 4, wherein the at least one memory and the computer program code are further configured to, with the at least one processor, cause the apparatus at least to:
  generate said pre-rule assuming that in relation to said local traffic offloading only one user plane function entity is under control of said intermediate session management function entity.

6. An apparatus comprising:
  at least one processor; and
  at least one memory including computer program code,
  the at least one memory and the computer program code configured to, with the
  at least one processor, cause the apparatus at least to:
  receive, from a session management function entity, a pre-rule, wherein the pre-rule is a partly-generated rule of a first N4 rule related to local traffic offloading with respect to at least one user plane function entity under control of said intermediate session management function entity, wherein said N4 rule is a packet detection rule, a forwarding action rule, a usage reporting rule, or a quality of service enforcement rule, and wherein said pre-rule comprises an indication that said intermediate session management function entity is to obtain information that is to be used to generate said first N4 rule to be transmitted to said at least one user plane function entity under control of said intermediate session management function entity;
  determine the information that is to be used to generate said N4 rule;
  generate, based on said pre-rule and said information, said first N4 rule related to local traffic offloading; and
  transmit said first N4 rule to said first user plane function entity.

7. A non-transitory computer readable storage medium comprising computer program code, the computer program code configured, upon execution by at least one processor, to cause the at least one processor to:
  obtain policy related information and charging related information;

generate a pre-rule based on said policy related information and said charging related information, wherein said pre-rule is a partly-generated rule of a N4 rule related to local traffic offloading with respect to at least one user plane function entity under control of an intermediate session management function entity, wherein said N4 rule is a packet detection rule, a forwarding action rule, a usage reporting rule, or a quality of service enforcement rule, and wherein said pre-rule comprises an indication that said intermediate session management function entity is to determine information that said intermediate session management function is to use together with said pre-rule to generate said N4 rule; and transmit said pre-rule to said intermediate session management function entity.

8. A non-transitory computer readable storage medium comprising computer program code, the computer program code configured, upon execution by at least one processor, to cause the at least one processor to:

receive, from a session management function entity, a pre-rule, wherein the pre-rule is a partly-generated rule of a N4 rule related to local traffic offloading with respect to at least one user plane function entity under control of an intermediate session management function entity, wherein said N4 rule is a packet detection rule, a forwarding action rule, a usage reporting rule, or a quality of service enforcement rule, and wherein said pre-rule comprises an indication that said intermediate session management function entity is to determine information that said intermediate session management function is to use with said pre-rule to generate said N4 rule;

determine the information that is to be used to generate said N4 rule;

generate, based on said pre-rule and said information, a first rule of at least one rule related to local traffic offloading; and transmit said N4 rule to said at least one user plane function entity.

9. The method of claim 1, wherein generating further comprises:

generating a second pre-rule based on said policy related information and said charging related information, wherein said second pre-rule is a partly-generated rule of a second N4 rule related to local traffic offloading with respect to user plane function entities under control of an intermediate session management function entity, and said second pre-rule comprises an indication that said intermediate session management function entity is to determine information locally to generate said second N4 rule to be transmitted to user plane function entities under control of said intermediate session management function entity; and wherein said transmitting comprises transmitting said second pre-rule to said intermediate session management function entity for generation of said second N4 rule.

10. The method of claim 1, wherein generating comprises generating based on receipt of information indicating that local traffic offloading to a local data network identified by a data network address identifier is possible.

11. The method of claim 3, wherein the information is access network related information.

12. The apparatus according to claim 4, wherein the at least one memory and the computer program code are further configured to, with the at least one processor, cause the apparats at least to:

generate a second pre-rule based on said policy related information and said charging related information, wherein said second pre-rule is a partly-generated rule of a second N4 rule related to local traffic offloading with respect to user plane function entities under control of an intermediate session management function entity, and said second pre-rule comprises an indication that said intermediate session management function entity is to determine information locally to generate said second N4 rule to be transmitted to user plane function entities under control of said intermediate session management function entity; and wherein said transmission comprises transmitting said second pre-rule to said intermediate session management function entity for generation of said second N4 rule.

13. The apparatus according to claim 4, wherein generation of the pre-rule comprises generating based on receipt of information indicating that local traffic offloading to a local data network identified by a data network address identifier is possible.

14. The apparatus according to claim 6, wherein the information is access network related information.

15. The computer program according to claim 7, wherein the computer program code is further configured, upon execution by the at least one processor, to cause the at least one processor to:

generate a second pre-rule based on said policy related information and said charging related information, wherein said second pre-rule is a partly-generated rule of a second N4 rule related to local traffic offloading with respect to user plane function entities under control of an intermediate session management function entity, and said second pre-rule comprises an indication that said intermediate session management function entity is to determine information locally to generate said second N4 rule to be transmitted to user plane function entities under control of said intermediate session management function entity; and wherein said transmission comprises transmitting said second pre-rule to said intermediate session management function entity for generation of said second N4 rule.

16. The computer program according to claim 7, wherein generation of the pre-rule comprises generating based on receipt of information indicating that local traffic offloading to a local data network identified by a data network address identifier is possible.

17. The computer program according to claim 8, wherein the information is access network related information.

* * * * *